United States Patent
Miyazaki

(10) Patent No.: US 6,285,977 B1
(45) Date of Patent: *Sep. 4, 2001

(54) MULTI-AGENTS COOPERATING METHOD AND SYSTEM

(75) Inventor: Kazuya Miyazaki, Kamakura (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,330

(22) Filed: Feb. 21, 1997

Related U.S. Application Data

(63) Continuation of application No. 08/228,732, filed on Apr. 18, 1997, now abandoned.

(30) Foreign Application Priority Data

| Apr. 20, 1993 | (JP) | 5-092684 |
| Mar. 4, 1994 | (JP) | 6-034454 |

(51) Int. Cl.[7] ................................... G06F 9/40
(52) U.S. Cl. .................. 703/26; 703/27; 707/104; 709/202
(58) Field of Search ............... 395/500, 200.31, 395/200.35, 200.57; 364/468.05, 468.06, 468.1; 707/10; 703/26, 27, 104; 709/202, 203

(56) References Cited

U.S. PATENT DOCUMENTS

| 4,656,580 | * | 4/1987 | Hitchock, Sr. et al. | 364/200 |
| 4,698,766 | * | 10/1987 | Entwistle et al. | 364/468 |
| 5,006,983 | * | 4/1991 | Wayne et al. | 364/401 |
| 5,019,963 | * | 5/1991 | Alderson et al. | 364/200 |
| 5,185,780 | * | 2/1993 | Leggett | 379/34 |
| 5,228,137 | * | 7/1993 | Kleinerman et al. | 395/500 |
| 5,249,290 | * | 9/1993 | Heizer | 395/650 |
| 5,291,394 | * | 3/1994 | Chapman | 364/401 |
| 5,295,065 | * | 3/1994 | Chapman et al. | 364/401 |
| 5,301,270 | * | 4/1994 | Steinberg et al. | 395/161 |
| 5,440,739 | * | 8/1995 | Beck et al. | 395/650 |
| 5,579,467 | * | 11/1996 | Miyauchi et al. | 395/326 |

FOREIGN PATENT DOCUMENTS

| 3-84652 | 4/1991 | (JP) . |
| 3-160526 | 7/1991 | (JP) . |
| 3-246745 | 11/1991 | (JP) . |
| 4-1208731 | 4/1992 | (JP) . |
| 348452 | 12/1992 | (JP) | G06F/15/16 |
| 5-134959 | 6/1993 | (JP) . |

OTHER PUBLICATIONS

Chi et al., "distributed Intelligent Agents in Decentralized Organizations," IEEE, 1993, pp. 292–300.*
Jone et al., Cooperative Support for Distributed Supervisory Control: Issues in.*
Kohn et al., "Multiple Agent Autonomous Hybrid Control Systems," IEEE, 1992, pp. 2956–2966.*

(List continued on next page.)

*Primary Examiner*—Kevin J. Teska
*Assistant Examiner*—Thai Phan

(57) ABSTRACT

A multi-agent cooperating system and method which is capable of being applied to a plurality of users with a simple composition and of performing efficient processing. The system comprises an agent group composed of a plurality of agents for providing services to the user, a user definition storing section for storing personal information such as user preferences for the options when requesting a service, and a user agent for converting the request from the user into an appropriate form with reference to the contents in the user definition storing section and transmitting them to the agent group, or transmitting the value of the attributes of the user with reference to the user definition storing section when user characteristics are requested from the agent group. The user agents are coupled to the agent group corresponding to each user.

12 Claims, 17 Drawing Sheets

OTHER PUBLICATIONS

Weihmayer et al., "Modeling Cooperative Agents for Customer Network Control Using Planning and Agent–Oriented Programming," IEEE, 1992, pp. 537–543.*

Rufat et al., "Distributed Coorperative Systems for Advanced Automation: Tradeoffs", IEEE, 1990, pp. 750–755.*

Victor Lesser, "A Reptrospective View of FA/C Distributed Problem Solving," IEEE, 1991, pp. 1347–1362.*

Bruce Chalmers, "A Planning Model for Real–Time Defence Resource All. and Sched in a Naval Command & Control System," IEEE, 1993, pp. 341–344.*

Lehner et al., "Probabilistic Plan Evaluation in a Classical Hierarchical Planner," IEEE, 1993, pp. 45–50.*

Toshiyuki Takahara et al., "Distributed Production System for Network," Information Processing Society of Japan, pp. 1–265–1–266 (with translation).

Kazuhiro Kuwabara et al, "Distributed Artificial Intelligence (2): Negotiation and Balancing," Jan. 1993, vol. 8, No. 1, pp. 17–25 (with translation).

* cited by examiner

Fig. 8
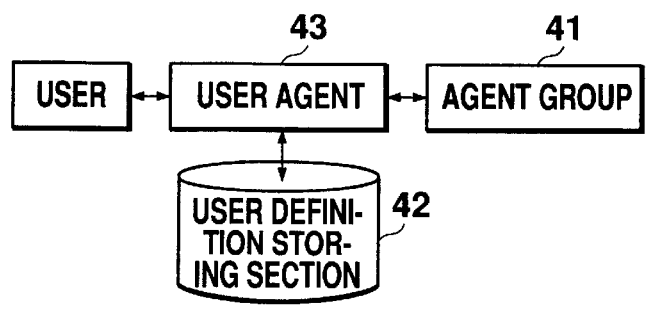
Fig. 9
PROFILE TABLE 44
| ATTRIBUTE NAME | ATTRIBUTE VALUE |
|---|---|
| NAME | - - - - - |
| POSITION | - - - - - |
| STAFF NUMBER | - - - - - |
| · · · · · | · · · · · |
Fig. 10
PREFERENCE TABLE 45
| SERVICE NAME | OPTION | WEIGHTED VALUE |
|---|---|---|
| PRINT SERVICE | HIGH RESOLUTION | 100 |
| PRINT SERVICE | HIGH SPEED | 20 |
| · · · · · | · · · · · | · · · · · |
Fig. 11
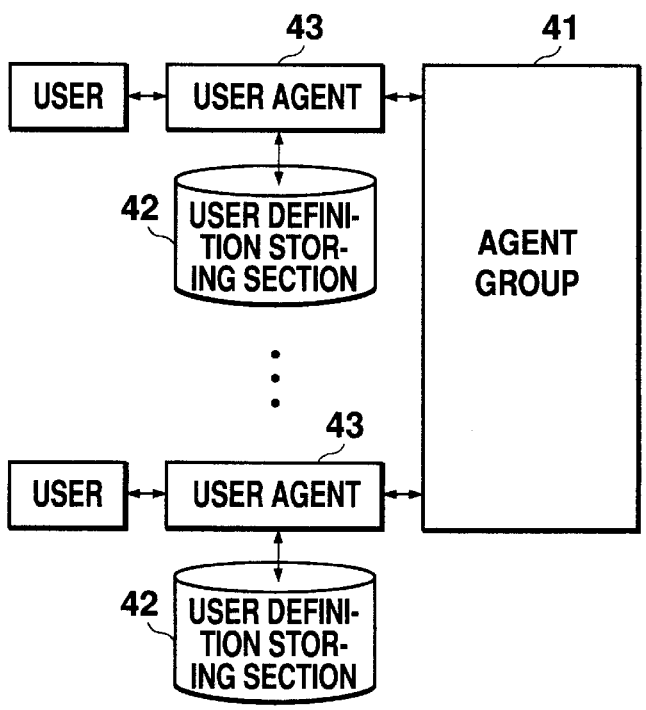

MULTI-AGENTS COOPERATING METHOD AND SYSTEM

This application is continuation, of application Ser. No. 08/228,732, filed Apr. 18, 1997, abandoned.

BACKGROUND OF THE INVENTION

1. Field of the Invention

The present invention relates to a multi-agents cooperating method and a system which is capable of readily describing a distributed application for providing services by cooperatively performing a plurality of applications and processes in a distributing environment composed of a plurality of computers mutually connected via a network.

2. Description of a Prior Art

An agent which is an entity of computing process such as a plurality of processes for performing a computing process on a distributed environment composed of a plurality of computers mutually connected via a network provides services in response to a request for service from a certain user or other agent.

FIG. 19 of the accompanying drawings is a block diagram of a conventional multi-agents cooperating system disclosed, for example, in Japanese Patent Laid-Open No. Hei 4-77827 and Japanese Patent Laid-Open No. Hei 4-279935. In FIG. 19, an agent providing a variety of services comprises a communicating section 102 for communicating information with an other agent, a communicating definition storing section 103 which is a data base storing definitions for determining contents of information to be communicated, procedure of communication and target of communication, communicating target determining and communicating section 104 for determining contents of information to be communicated, procedure of communication and target of communication by referring to the contents of the communicating definitions storing section 103, a rule base storing definitions of manner of plan or planning, and contents of the services, and a planning and service executing section 106 for providing planning and service referring to the contents of the rule base 105.

An operation of the conventional system will now be described with reference to the drawings. FIG. 20 is a flow diagram showing a total summary of the conventional system. As shown in FIG. 20, the process in the conventional system comprises a step 201 for determining if the ordered service is accepted to execute, a step 202 for determining if the order is really entrusted or not, and a step 203 for performing requested services.

In step 201, the agent 101 estimates contents (specification) of services requested by the other agent or user and decides, if it is acceptable, to execute processing to provide the requested services. If the agent 101 desires to accept the request, it inquires conditions for the acceptance to the other agent or user. In step 202, the other agent or user estimates the conditions to accept the request returned from the agent with its particular criterion so as to determine if it actually entrusts the execution of the services. In step 203, the agent 101 executes services having been entrusted thereto.

FIG. 21 is a detailed flow diagram of step 201 for determining if it accepts requests to execute the requested services. The step 201 for determining if it accepts requests to execute the requested services comprises a step 204 for receiving specification of the service requested by the other agent or user by the agent 101, a step 205 for estimating the specification of the requested service having been received in step 204 by the agent 101, a step 206 for determining if the agent 101 desires to accept the request on the basis of the estimated result in step 205, and a step 207 for transmitting reply of desiring to accept the request when the agent 101 has decided to accept the request in step 206.

In step 204, the agent 101 receives specification of services to be executed by the communicating section 102 from the other agent or user. In step 205, the agent 101 estimates a variety of restricting conditions for executing the services by the transmitting target and communicating section 104 in accordance with the procedure and restrictions of communication defined in the communicating definition storing section 103, refers to the rule base 105 in the planning and service executing section 106, and estimates the probability of executing the service by trying to produce a plan for executing the specification of the service. In step 206, the agent 101 judges if it accepts the request to perform the service on the basis of the estimated result in step 205. As a result of the judgment, if it does not accept it, the operation terminates. In the case of accepting the request, the agent 101 transmits the conditions for executing the service to the other agent or user through the communicating section 102 in step 207.

FIG. 22 is a detailed flow diagram of step 203 for executing the service having been entrusted in FIG. 20. Step 203 for executing the entrusted service comprises step 208 for receiving messages representing to entrust the service, step 209 for entrusting partial service after communicating with an other agent if necessary for executing the entrusted service, and step 210 for executing partial service by the agent 101.

In step 208, the agent 101 receives service-entrusting information from the other agent or user having decided to entrust the service in step 202 through the communicating section 102. In step 209, the agent 101, for executing the plan produced in the planning and service executing section 106 for executing the service, its transmitting target determining and communicating section 104 communicates through the communicating section 102 in accordance with the procedures and restrictions which are defined in the communicating definition storing section 103 with the other agent capable of executing a part of the plan when required. In step 210, the service which can be processed by the agent 101 itself is executed in the planning and service executing section 106.

FIG. 23 is a block diagram of a conventional multi-agent cooperating system disclosed for example in Japanese Patent Laid-Open No. Hei 3-84652. In FIG. 23, the multi-agent cooperating system comprises a plurality of agents 111 for providing a variety of services, a user information administering section 112 for storing information from users, and a common memory 113 for communicating information among the user, agent 111 and the user information administering section 112 which use the multi-agent cooperating system.

The operation of the conventional system will now be described with reference to FIG. 23. When the user inputs a certain request to the common memory 113, any agent 111 estimates the request by referring to the contents of the user information administering section 112. When the agent 111 judges to be able to process the request, the processed result of the service held by the agent 111 is written into the common memory 113. If any competition arises due to a plurality of agents 111 trying to provide services, the competition would be resolved by eventually selecting a single service result among the competed services.

According to the conventional cooperating system and method shown in FIG. 19, however, definitions on the planning and resource division are mixedly stored in the same agent and are not processed by clearly distinguished steps. As a result, the definitions of the agent and the whole system would be complicated, and the coverage of the processing section would become difficult.

In the conventional system, it has been necessary to describe the relationship to the other agent at the portions related to the plan and communication in all of the agents. This would break the independency of the definitions of the agent, such that the extent of the system would be reduced.

Further, in the conventional system, the definitions of the cooperating operations are relative to the communicating procedure and communicating target, so as to distribute the cooperating manner to a plurality of agents. As a result, the change of the agent organization and the cooperation would be more difficult.

Since the conventional system has been composed of agents having different functions but with the same level, the definitions relating to the cooperative operations and planning in a variety of forms requested when practically applied would be complicated.

Further, in the conventional system, as the estimating criterion for accepting tasks by the agents, those having a certainly wide range of allowance such as cost and those having narrow range of allowance such as restrictions have been treated equally without any clear difference, it has been difficult to construct a system that can appropriately reply to a variety of situations and user requests.

In addition, since the conventional multi-agent cooperating system shown in FIG. 23 is composed as mentioned above, all of the agents must capture the format, contents and manner of use of the user information administering section. As a result, the composition of the whole system and the agents would become complicated. Further, it has been impossible to cope with a plurality of users.

Moreover, since the agent itself contains the definitions relative to the manner of cooperative operation to be performed with a suitable judgment of the actual situation for processing the request from the user, the amount of described contents from the agent would be enormous.

Since the same cooperative operation is repeated for the same request each time the user makes a request, approximately the same time is consumed at every request so as to cause low efficiency.

Further, since a single memory is used as a space for performing a cooperating process by a plurality of agents, the system description would be complicated and the processing efficiency would be lowered from a standpoint of effectively utilizing the services by the user in such a distributed environment as a number of computers are mutually coupled via a network.

SUMMARY OF THE INVENTION

The present invention has been attained to overcome problems as mentioned above, and is aimed at providing a multi-agent cooperating system and method which is capable of readily defining flexible cooperative operation of a wide application range and attending to the user requests, and system change and extension.

It is another object of this invention to provide a multi-agent cooperating system capable of operating in accordance with a plurality of users by a simple system composition without adding a complicated interpreting function to the agent.

It is further an object of this invention to provide a multi-agent cooperating system which is capable of efficiently processing the user request in a shorter time.

To attain such objects as aforementioned, a multi-agent cooperating method according to this invention provides services as requested by a user by cooperation of a plurality of agents, the planning method provides separation of which is obtaining combination of functions for attaining services requested by a user, data to be transmitted and received between the functions, and plans for the order in which the data is executed from resource division, which is a problem of distributing tasks so that tasks for attaining services for elemental functions so as to maintain the balance of load state or operating state of the resource connected to the elemental function or the elemental function for attaining the service requested by the user such that the problem is solved by the divided process for each problem.

Further, in the aforementioned multi-agent cooperating method, the definition of the specification with regard to the group of the members of the aforementioned agent and the procedure of the cooperation between the agents, the definition of the elemental function, and the definition of the plan, are defined separately from each other, and the agent executes the cooperative operation in accordance with the definition.

According to another embodiment of this invention, a multi-agent cooperating system for providing services in accordance with a request from user by cooperation of a plurality of agents comprises: one or more elemental function agents for providing elemental functions; one or more planning agents having definitions relating to the plan and having the ability to distribute tasks; and a field manager connected via said elemental function agents and planning agents, having definitions relating to the collection of the members of the planning agents and the elemental function agents and the procedure of cooperation between these two agents so as to administer the cooperative operation between the agents.

Further, in the aforementioned multi-agent cooperating system, the field manager comprises: a communicating means for transmitting/receiving information to/from the agents or the user; a cooperative definition data base for storing the members of the agent to perform the cooperative operation and the definition of the procedure of the cooperative operation; and a cooperative operation performing means for transmitting a message to make the agent perform the cooperative operation with reference to the definition of said cooperative definition data base via the communicating means.

Furthermore, according to the multi-agent cooperating system, the planning agent comprises: a communicating means for transmitting/receiving information to/from said agent or user; a rule base for storing rules to generate a plan; a planning performing means for generating a plan with reference to the rule base; an estimating data storing means for storing basics to estimate the request contained in the message from the field manager; and an estimating means for making estimation in accordance with the data contained in said estimating data storing means.

Further, according to the multi-agent cooperating system of this invention, the elemental function agent comprises: a communicating means for transmitting/receiving information to/from the agent or user; an functional definition storing means for storing a definition of an elemental service function or a part thereof; a service executing means for executing service or a part thereof in accordance with the contents of said elemental function definition storing means; an estimating data/profile storing means for storing estimating basics and profiles; and an estimating means for estimating in accordance with the data stored in said estimating data/profile storing means.

Further, according to the invention, there is provided a multi-agent cooperating method for executing cooperative operation using the multi-agent cooperating system, comprising the steps of: receiving a service request from a user in said field manager; transmitting the service request, with instructions related to cooperation added thereto, to the planning agent; executing estimation and planning in accordance with the service request and the instructions in the planning agent; judging if the result of the estimation in accordance with the service request and the instructions has reached a prescribed criterion and further the plan has been obtained; asking for the elemental function agent to make an estimation as to load; returning the result of the load estimation to the planning agent in the elemental function agent; making a general estimation of the estimated result from the planning agent and the elemental function agent; determining a planning agent to ask for the work to execute the service based on the result of the general estimation and informing this agent of that; and executing the process in accordance with the plan or with the elemental function agent in the entrusted planning agent.

Further, a multi-agent cooperating method for executing cooperative operation using said multi-agent cooperating system comprising the steps of: transmitting the profile stored in the estimating data/profile storing means to the field manager and the planning agent in the elemental function agent to be newly installed in the multi-agent cooperating system; estimating the contents of the profile received from the elemental function agent in the field manager and the planning agent; judging if the contents of the profile should be registered; and registering the elemental function agent in the cooperative definition data base as a member.

Further, according to the multi-agent cooperating system of this invention, as estimating criterion for entrusting and accepting tasks in the agent, there are provided classes of: restrictions that must be satisfied necessarily in view of specification; basics with relatively wide allowance which are prioritized in accordance with user or user's preference; and basics related to cost of resource that can be calculated from the load state of the CPU or associated equipments.

According to another embodiment of this invention, a multi-agent cooperating system for providing services in accordance with the request from the user by cooperative operation of a plurality of agents, comprising: one or more planning agents having definitions as to plan and ability of distributing tasks; a means for describing the plan in the definition of the planning agent; and a describing means for defining the plan for the user.

Further, in the aforementioned multi-agent cooperating system, the planning agent comprises a plan base for storing the plan having been described by the plan describing means, and a plan interpretation executing means for interpreting and executing the contents of the plan base.

According to another embodiment of this invention, a multi-agent cooperating system for providing services in reply to a request from user by cooperative operation of a plurality of agents, comprising: a user definition storing means provided for each user in order to store personal information related to each user; and a user agent provided to correspond to each user definition storing means for processing the request from the user by, for example, adding options thereto and then transmitting it to the agent.

In the aforementioned multi-agent cooperating system, the personal information contains user attribute representing objective characteristics of each user; and options to be used when requesting services.

According to another embodiment of this invention, a multi-agent cooperating system for providing services in reply to the request from user by cooperative operation of a plurality of agent, comprising: agents for providing services requested by the user; a field manager for administering the cooperative operation among the agents by adding cooperative information as instructive information related to the cooperative operation to the message, wherein a plurality of agents cooperate in the field being within the scope of the field manager using the messages.

In the aforementioned multi-agent cooperating system, the agent comprises a means for executing instructions contained in the instructive information corresponding to the instructive information.

In the aforementioned multi-agent cooperating system, there are provided a means for executing the services of the agent, an estimating means for estimating input messages, and an attributes storing means for storing attributes of the agents.

According to another embodiment of this invention, there is provided a multi-agent cooperating system for providing services in reply to a request from a user by cooperative operation of a plurality of agents, comprising a means for storing a combination of a pattern requested by the user and an agent corresponding to the request among the agents available for processing the request, wherein when a request for the same pattern is input, the request is preferentially distributed to this agent.

According to another embodiment of this invention, there is provided a multi-agent cooperating system for providing services in reply to a request from a user by cooperative operation of a plurality of agents, comprising a means for storing the pattern of request from the user and agent which would provide an estimated value equal to or more than a predetermined estimation criterion among the agents available for processing the request, wherein when a request of the same pattern is input again, the cooperative operation is executed only between the agents.

According to another embodiment of this invention, there is provided a multi-agent cooperating method for executing cooperative operation using a multi-agent cooperating system for providing services in reply to a request from a user comprising agents for providing services requested by a user, field managers for managing cooperative operations among the agents, so that a plurality of agents cooperate using message in a field being a scope of management by the field manager, wherein the field manager performs functions comprising the steps of: informing the agents in the field of the request from the user; presenting the conditions to accept the requests from the agent having been judged to be able to process the request to the user collectively; and making an agent corresponding to the condition designated by the user among the presented conditions execute the request.

According to another embodiment of this invention, a multi-agent cooperating system for presenting services corresponding to a request from a user by cooperative operation of a plurality of agents, comprising a means for presenting conditions to accept the processing by the agent for the request from the user collectively to the user, making the user select an appropriate agent, and entrusting the execution of the process to the selected agent.

In the multi-agent cooperating method of this invention, there are provided a means for defining the planning process and resource distributing process by separating them from each other, and a means for solving both process by two clearly divided processing steps. As a result, it is possible to deal with process of wide range, and the system for defining and processing the process can be simplified so that specification of the agents for planning and resource distribution and of the total system can be simplified.

Further, it is possible to simplify the cooperative definition and process by the means for defining the specification related to the procedure of the cooperation of the collection of the members of the agents and the agents to perform the cooperation from the definition of the elemental function and the definition of the plan and the means for executing the cooperative operation by the agents in accordance with the definition, so that the specification of the agents and the total system as to the cooperation can be simplified.

Further, providing the means for defining the plan for planning agent separately from the elemental function agent for providing an elemental function and the means for processing based on that would serve to clarify and simplify the total specification of the system and the specification of each agent as to the planning and the resource distribution. In addition, since the definition as to the plan is collected, the definitions for the other agents would be more highly independent from other portions of the system.

Since the means for collecting the processes related to the specification on the cooperative operation to the field manager is provided, the specification of each agent relating to the cooperation and the specification of the total system is clarified and simplified. Due to the collection of the definition on the cooperation, the other portion of the system related to the definition of the agents would be highly independent from the definition of other portions of the system.

In addition, for introducing a new elemental function agent to the system, due to the provision of a means for communicating information of the profile of an elemental function agent to be introduced into a proper region to the planning agent or field manager of the proper region, and a means for judging the utility of the newly incorporated elemental function agent by each planning agent and the field manager and registering the elemental function agent as a target to entrust the process when judging as available, when the elemental function agent is extended for the system, the system would automatically renew the necessary data due to the extension of the elemental function agent. As a result, it is totally unnecessary to manually renew the existing system, and no description other than the agent itself would be necessary so that the independency of the definition of the agent would become higher.

Further, three classes of criterion with different allowance range or weight are established as estimating criterion for task entrusting/accepting of the agents, and a means for defining the classes and estimating them for each class is provided. As a result, the definition of estimation and the provision of the process can be simplified so that a variety of estimation corresponding to situations can be made and the efficiency of the estimation would be improved.

In addition, since a means for freely defining the plan in the planning agency by the end user is provided, it is possible for the end user and the other programs to produce, as required, agents which have their own plan. As a result, the extension degree and flexibility are increased.

In the multi-agent cooperating system according to this invention, each user would access the multi-agent cooperating system through the user agent that uniquely manages its own information. The user agent modifies options in reply to the request of services from the user and converts them into appropriate forms which could be interpreted by each agent to be transmitted. In addition, the user agent can also obtain user information by almost the same communication as in the case of making communication between the agents. If a plurality of users exist, the user agent is connected to the multi-agent cooperating system in correspondence to each user.

Further, according to the multi-agent cooperating system of this invention, the cooperative operation may be made in accordance with the contents of the cooperative information transferred from the field manager, so that the agent can easily realize complicated operations just by providing means corresponding to the contents of information included in the cooperative information.

In the multi-agent cooperating system of this invention, the requested pattern and the agent corresponding to the request are stored, so that the stored agent can preferentially process when a request of the same pattern is input, without unnecessarily repeating the same cooperative operation for the same request each time.

In the multi-agent cooperating system of this invention, further, the requested pattern, and among the agents corresponding to the request agents having values not less than the estimating criterion of the field are stored, and when a request of the same pattern is input again, the cooperative operation limited just between these agents are carried out.

According to the multi-agent cooperating system of this invention, the user inputs a request without designating any agent, then conditions of agents available for processing the request are presented. The user selects an agent to actually perform the processing.

The above and other objects, features and advantages of this invention will become clear from the following description of the preferred embodiment thereof, taken in conjunction with the accompanying drawings.

BRIEF DESCRIPTION OF THE DRAWINGS

FIG. 8 is a block diagram of a multi-agent cooperating system according to a third embodiment of this invention;

FIG. 9 is a profile table showing contents of a user definition storing section according to a third embodiment of this invention;

FIG. 10 is a preference table showing contents of a user definition storing section according to the third embodiment of this invention;

FIG. 11 is a block diagram showing a multi-agent cooperating system corresponding to multi-users according to the third embodiment of this invention;

DETAILED DESCRIPTION

First Embodiment

A first embodiment according to the present invention will now be described with reference to the drawings.

Figure 1:
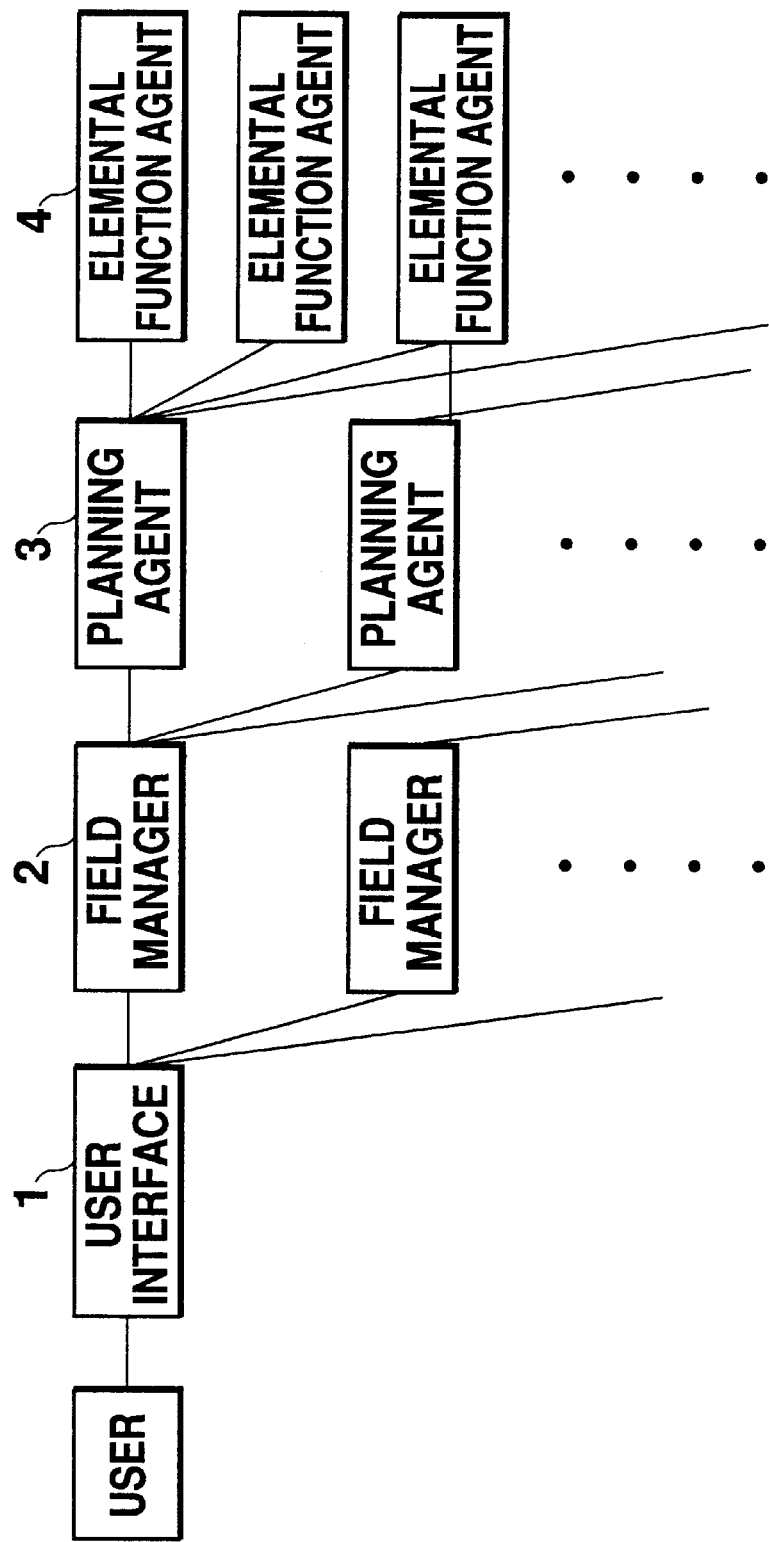
FIG. 1 is a block diagram showing a general composition of a multi-agent cooperating system according to a first embodiment of this invention.

FIG. 1 is block diagram showing a general composition of a multi-agent cooperating system according to a first embodiment of this invention. This multi-agent cooperating system comprises: a user interface 1 for communication between an end user and a multi-agent cooperating system of this embodiment; a field manager having definitions of collection of members of agents to execute cooperative operations and procedures of the cooperative operations in the multi-agent cooperating system so as to make the other agent execute cooperative operation; a planning agent having definitions as to plan; and an elemental function agent having an elemental function to perform services.

Figure 2:
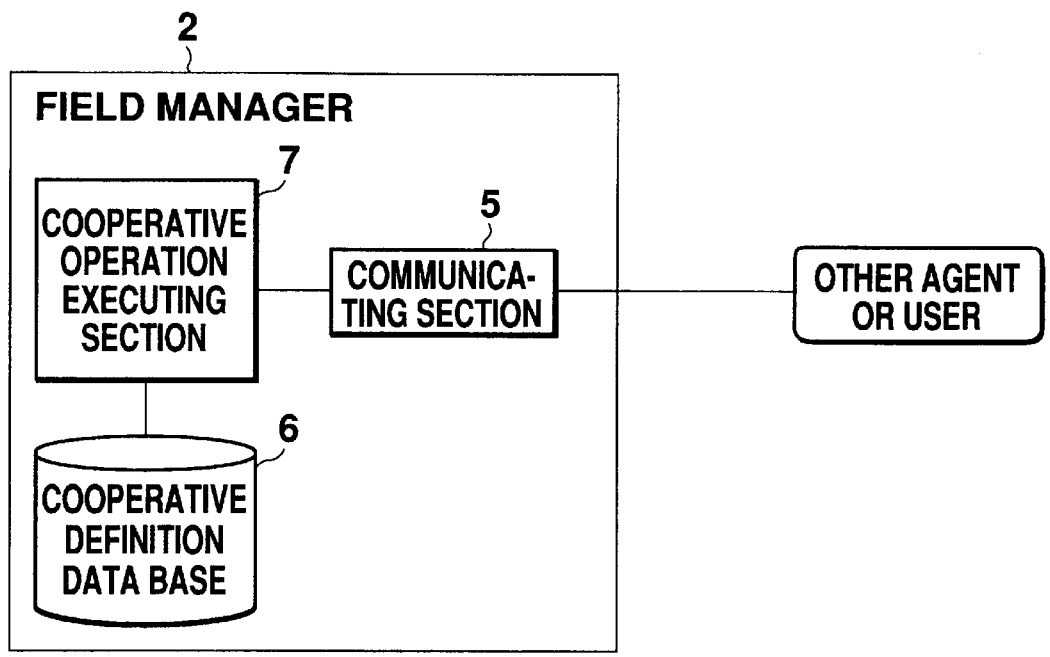
FIG. 2 is a block diagram showing the inner composition of the field manager according to the first embodiment of this invention.

FIG. 2 is a block diagram showing the inner composition of the field manager 2 in FIG. 1. In FIG. 2, the field manager 2 comprises: a communicating section 5 for transmitting/receiving information to/from the agent or the user; a cooperative definition data base 6 for storing definitions of procedures of member and cooperative operations of agents to perform the cooperative operation; and a cooperative operation executing section 7 for communicating message for making other agent execute cooperative operation via the communicating section 5 referring to the definition of the cooperative definition data base 6.

Figure 3:
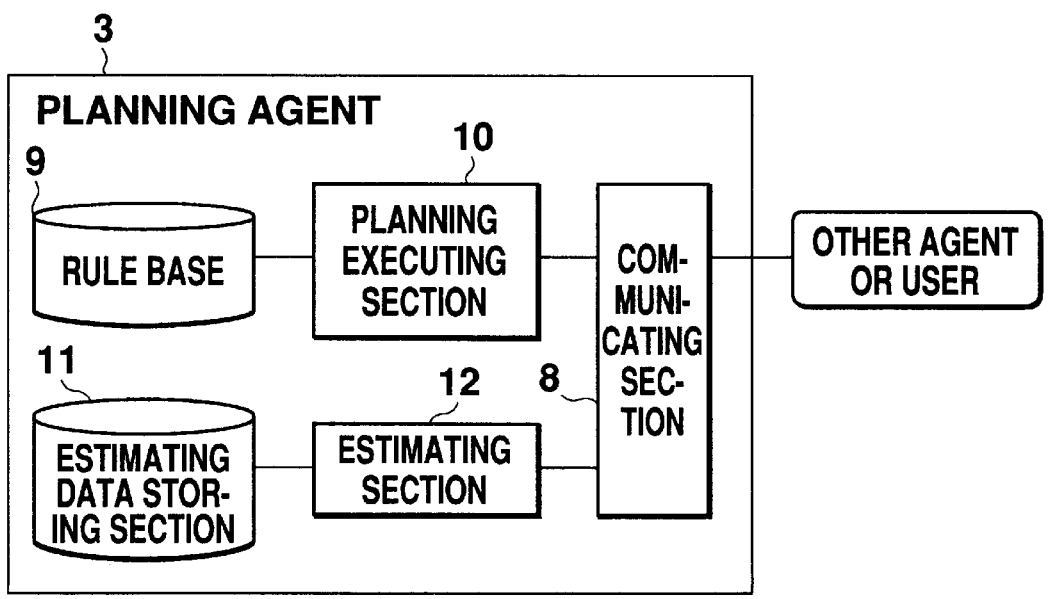
FIG. 3 is a block diagram of the inner composition of a planning agent according to a first embodiment of this invention.

FIG. 3 is a block diagram showing the inner composition of the planning agent 3 in FIG. 1. The planning agent 3 comprises: a communicating section 8 for transmitting/receiving information to/from other agents or a user; a rule base 9 for storing rules to produce plans; a planning executing section 10 for producing plans with reference to the rule base 9; an estimating data storing section 11 for storing criterion to estimate the request contained in the message from the field manager 2; and an estimating section 12 for making estimation in accordance with the contents of the estimating data storing section 11.

Figure 4:
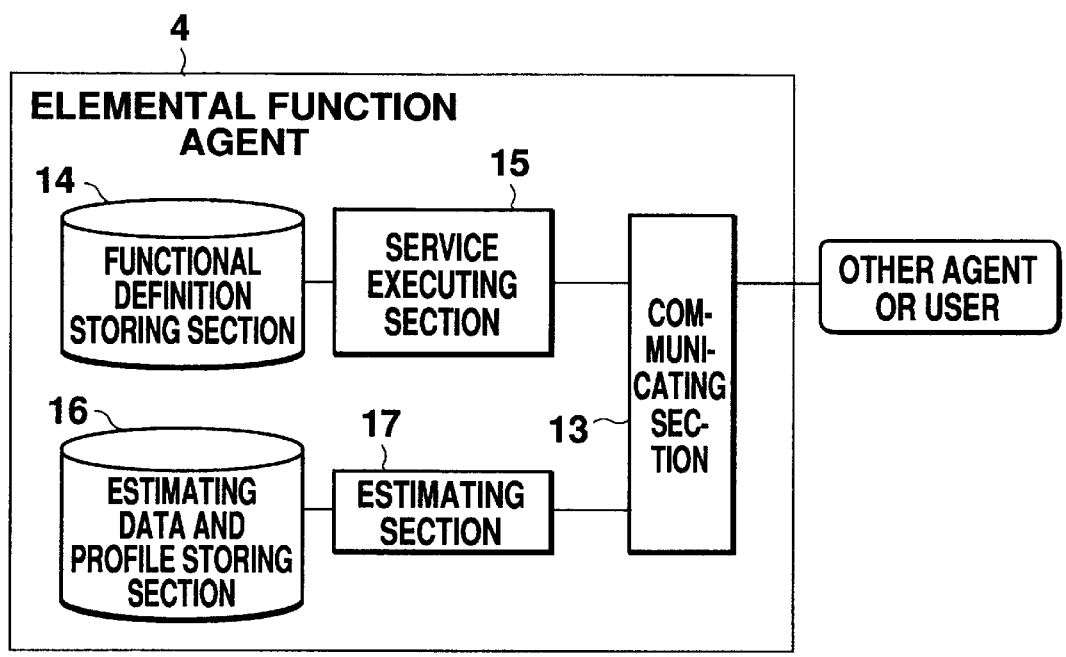
FIG. 4 is a block diagram showing the inner composition of an elemental function agent according to a first embodiment of this invention.

FIG. 4 is a block diagram showing the inner composition of the elemental function agent 4. In FIG. 4, the elemental function agent 4 comprises: a communicating section 13 for transmitting/receiving information to/from other agents or a user; a functional definition storing section 14 for storing definitions of services or elemental functions being a part thereof; a service executing section 15 for executing services or a part thereof in accordance with the contents of the functional definition storing section 14; an estimating data/profile storing section 16 for storing estimating criterion and profile; and an estimating section 17 for making estimation in accordance with the estimating data and profile.

The term planning signifies a problem to obtain combination of functions to attain services requested from a user, data to be transferred between functions, and plans being the procedures to execute them. The term resource distribution is a problem to distribute tasks to attain the services for the elemental function so that the balance between the elemental function to attain the plan or operating state of resources coupled to the elemental function or the load state can be maintained.

As a significant feature of this invention, the planning and the resource distribution are separated from each other, so that the problem can be solved by a process of two stages divided for each problem. Further, the specification as to the procedure of cooperation between the agents and the collection of the members of the agents to cooperate, the elemental function and the plan are defined separately from each other so that the agents can cooperate in accordance with the definitions. As a result, it is possible to easily describe the application and change the definitions.

Figure 5:
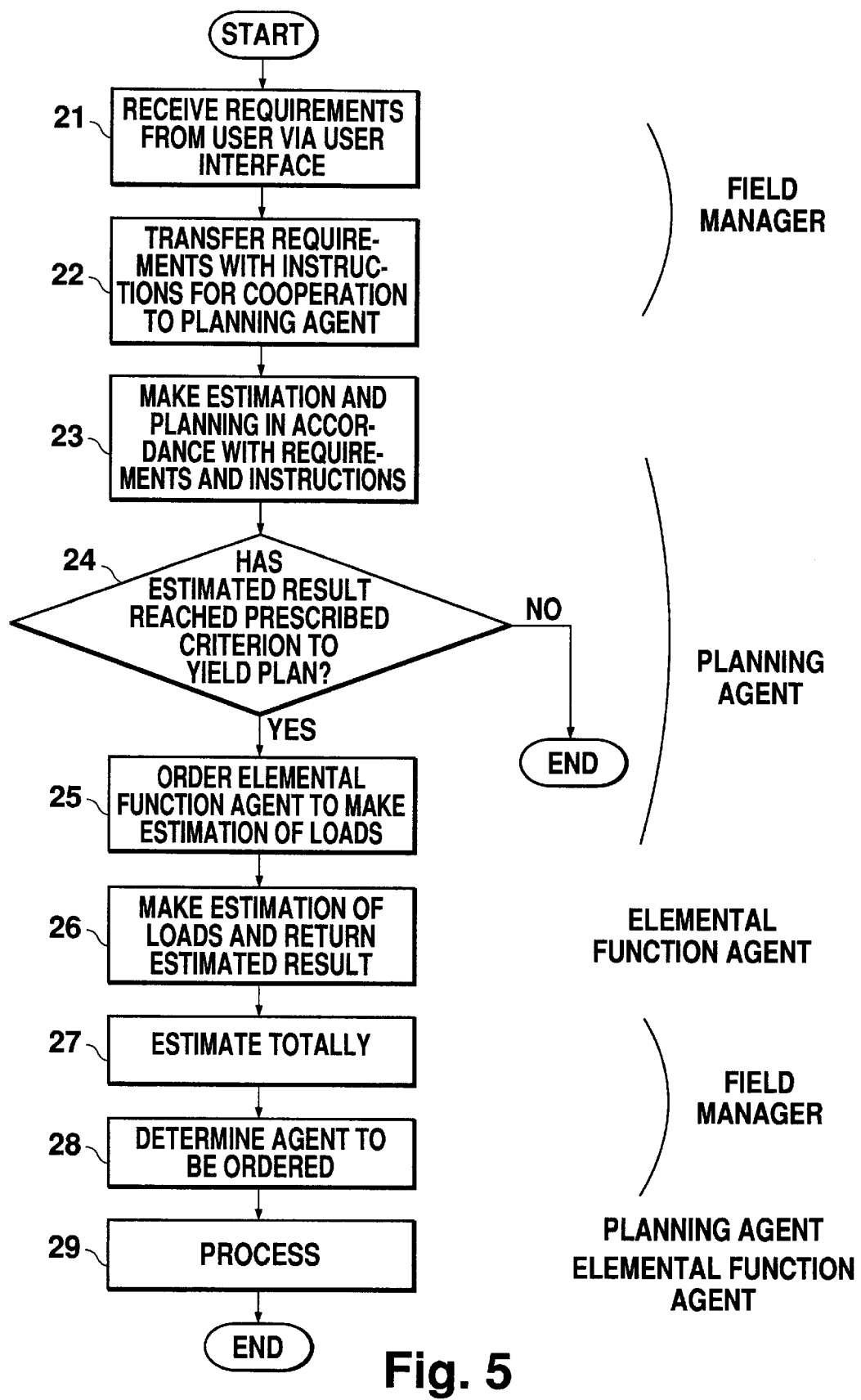
FIG. 5 is a flow diagram representing the cooperative operation of the agent according to the first embodiment of this invention.

A cooperative operation according to this embodiment will now be described with reference to the drawings. FIG. 5 is a flow diagram showing the cooperative operation of the agents in this embodiment. The cooperative operation of the agents includes: a step 21 for receiving a service request from the user by the field manager via the user interface 1; a step 22 for adding instructions relating to the cooperation to the service request and transmitting it to the planning agent 3; a step 23 for making estimation and planning in accordance with the service request and the instructions; a step 24 for judging if the estimated result reaches a prescribed criterion and the plan has been obtained; a step 25 in which the planning agent 3 entrusts the elemental function agent 4 to estimate the load; a step 26 in which the elemental function agent 4 estimates the load and returns the estimated result; a step 27 in which the field manager 2 generally estimates the estimated result returned from the planning agent 3 and the elemental function agent 4; a step 28 in which the field manager 2 determines the planning agent 3 for entrusting the task to actually attain the service from the result of the general estimation and transmitting the determined result; and a step 29 in which the entrusted planning agent 3 executes the process with the elemental function agent 4 in accordance with the aforementioned plan.

Details of the cooperative operation will now be described with reference to FIG. 5.

In the step 21, the field manager 2 receives the service request having been input by the user through the interface 1 via the communicating section 5. In the step 22, the field manager 2 transfers the instructions generated by the cooperative operation executing section 7 in accordance with the description in the cooperative definition data base 6 which is added to the service request from the user to appropriate planning agents 3 that are members to the planning agent 3. In step 23, the planning agent 3 estimates the specification of the services requested by the user in the estimating section 12 in accordance with the contents of the estimating data storing section 11, and the planning execution section 10 generates plan to execute the service requested in accordance with the contents of the rule base 9. In step 24, the planning agent 3 judges if the aforementioned estimated result has reached the prescribed criterion and the plan has been obtained. If the criterion is not satisfied or no plan is obtained, the planning agent 3 terminates its operation. Otherwise, in step 25, the planning agent 3 entrusts a necessary elemental function agent 4 via the communicating section 8 to estimate the position of the device associated with the elemental function agent 4 and the load via the communicating section 8. At this time, necessary information for the estimation is transmitted with the entrust. In step 26, the elemental function agent 4 receives the entrust via the communicating section 13, and estimates the received information in accordance with the contents in the estimating data and profile storing section 16, and returns the estimated result to the planning agent 3 via the communicating section 13. In step 28, the field manager 2 determines a planning agent 3 for entrusting the task to actually attain the services on the basis of the result of the general estimation for entrusting it to execute the task. In step 29, the planning agent having been entrusted processes the task together with the appropriate elemental function agent 4 in accordance with the aforementioned plan.

In the aforementioned process, there are three types of estimation criterion for entrusting or accepting the task, namely the process for the planning agent or the elemental function agent 4. These are a criterion that must be necessarily satisfied in view of the specification, a criterion having a wide range of allowance and being preferentially graded by the user based on the user requirements, and a criterion as to the cost of a resource calculated from the load state such as associated equipments or CPU. The estimation is made on the basis of these criterion.

In the aforementioned steps 23 and 24, the planning agent 3 estimates the specification of the service request from the user in the estimating section 12, and terminates the operation at this time point if the result does not reach the prescribed criterion. Otherwise, it would be possible that the planning executing section 10 generates plan and proceeds to the step 25 if the plan is obtained.

Further, it is also possible to return the estimated result of the elemental function agent 4 to the field manager 2.

In addition, the general estimation of the step 27 can also be presented to the user via the user interface 1 in an appropriate form of the total estimation result without performing in the field manager 2 to be executed by the user. Also, it is possible in the same manner that the determination of the entrusted agent in step 28 is executed by the user.

Figure 6:
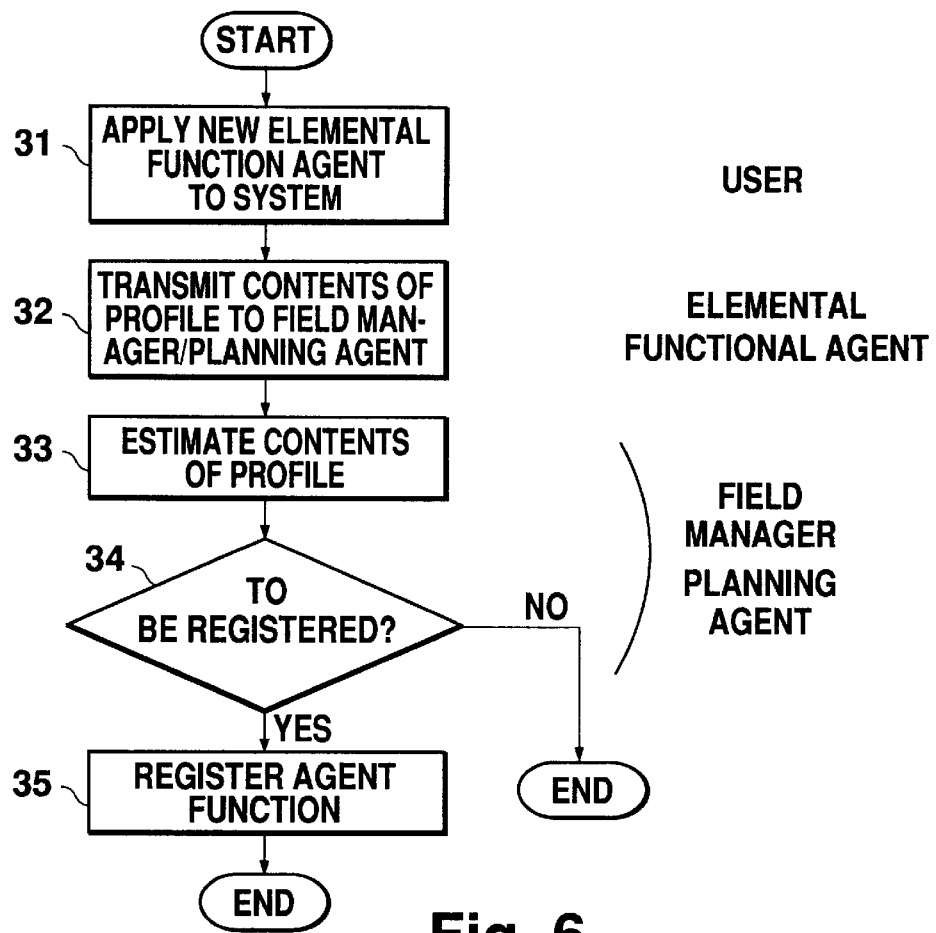
FIG. 6 is a flow diagram representing the operation of a new elemental function agent when started according to the first embodiment of this invention.

An operation of this embodiment when a new elemental function agent 4 is started will be described with reference to the drawings. FIG. 6 is a flow diagram representing operations associated with the start of the new elemental function agent 4 according to this embodiment. The operation associated with the start of the new elemental function agent 4 comprises: a step 31 in which the user inputs a new elemental function agent 4 to the system; a step 32 in which the elemental function agent 4 transmits the profiles of the estimating data and the profile storing section 16 to the field manager 2 and the planning agent 3; a step 33 in which the field manager 2 and the planning agent 3 estimates the contents of the received profile; a step 34 for judging if the field manager 2 and the planning agent 3 are to be registered; and a step 35 in which the field manager registers the elemental function agent 4 in the cooperative definition data base 6.

Details of the cooperative operation will now be described with reference to FIG. 6.

In step 31, the user install a new elemental function agent 4 into the system. In step 32, the elemental function agent 4 transmits the estimating data for estimating the specification and the profile in the estimating data and profile storing section 16 via the communicating section 13 to the field manager and the planning agent 3. In step 32, the field manager 2 and the planning agent 3 receive the profile through the communicating section 5 and 8. In step 33, the field manager and the planning agent 3 refer the contents in the profile to the contents in the cooperative definition data base 6, estimating data storing section 11, and the rule base 9 for estimating if the elemental function agent 4 is necessary for the field manager 2 or the planning agent 3. In step 34, if it is unnecessary for the field manager 2 or the planning agent 3 to be registered, the process in the field manager 2 and the planning agent 3 terminates. If it is judged as necessary, in step 35, the field manager 2 registers the elemental function agent 4 as a member in the cooperative definition data base 6.

Second Embodiment

A second embodiment of this invention will now be described with reference to the drawings.

Figure 7:
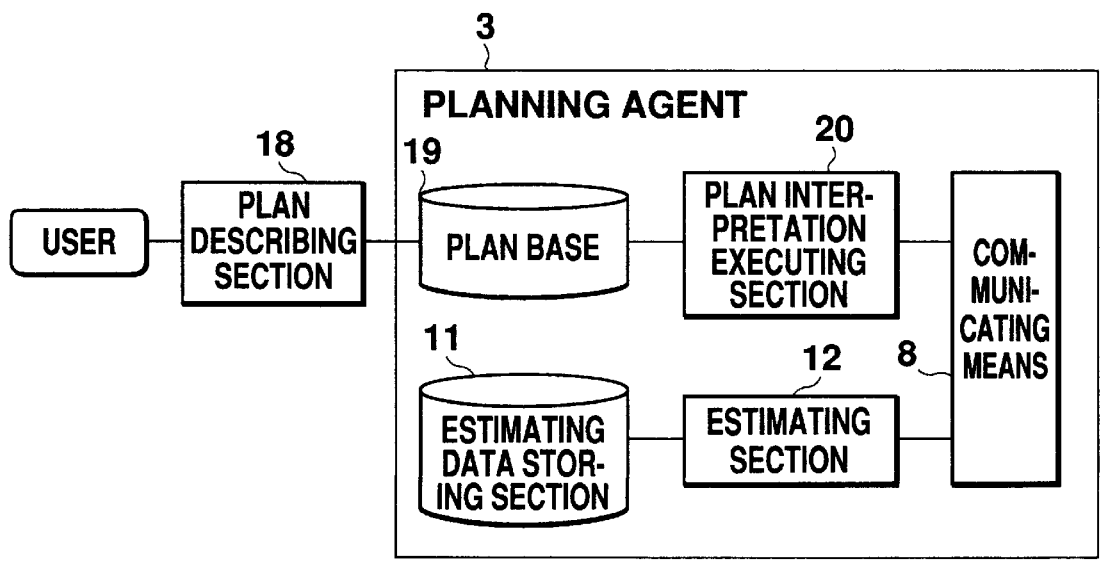
FIG. 7 is a block diagram showing a planning agent when a means for describing the plan is provided in the definition of the planning agent according to a second embodiment of this invention.

FIG. 7 shows an embodiment having a means for describing plan in the definition of the planning agent 3. The function of the planning agent 3, communicating section 8, the estimating data storing section 11, and the estimating section 12 is almost the same as that in FIG. 3. The planning agent 3 further comprises a plan describing section 18 for making the user describe the plan, a plan base 19 for storing plan described by the plan describing section 18, and a plan interpretation executing section 20 for interpreting and executing the contents of the plan base 19.

In this embodiment shown in FIG. 7, the user uses the script language presented in the plan describing section 18 to describe a combination of functions to attain a certain service, data to be transmitted/received between the functions, and plan being a procedure to execute the data. The contents of the description are stored in the plan base by the plan describing section 18 so as to define a planning agent having a new plan by the user definition. The plan having been stored in the plan base 19 will be interpreted and executed by the plan interpreting/executing section 20.

The plan describing section 18, the plan base 19, and the plan interpreting section 20 can also be provided together with the rule base 9 and the planning executing section 10 of the planning agent 3 shown in FIG. 3. In this case, the plan base 19 is firstly tried for application in reply to the service request from the user, and then the planning executing section 10 executes the plan generation. As a result, possibility of making the plan generation taking a long time be unnecessary would arise, so that the efficiency for obtaining a plan by the planning agent 3 can be improved.

Third Embodiment

FIG. 8 shows a third embodiment of this invention. The multi-agent cooperating system comprises an agent group 41 composed of a plurality of agents for providing services to the user; a user definition storing section 42 for storing personal information of the user; a user agent 43 for referring to the contents of the user definition storing section 42 and converting a request from the user into appropriate form to be transferred to the agent group 41. FIGS. 9 and 10 show contents of the user definition storing section 42 according to this embodiment which respectively represent a profile table 44 for standing for the user attributes being user's objective characteristics such as name, section etc. and a preference table 45 representing preferences of the user for the option when service is requested. FIG. 11 shows a correspondence to multi-user of a multi-agent cooperating system which is composed to be capable of coping with a plurality of users in this embodiment. As shown in FIG. 11, each of the user agents 43 is coupled to the agent group 41 in correspondence to each user.

In the multi-agent cooperating system composed as mentioned above, the user inputs a request via the user interface presented by the user agent 43. The user agent having received the request refers to the preference table 45 and the profile table 44 of the user definition storing section 42 and carries out supplementary processing such as adding an option such as the resolution shown in FIG. 10 to the request so as thereafter to input to the agent group 41. Namely, the request input by the user is converted into an appropriate form reflecting the characteristics of the user so that the system can interpret the request input by the user to be transferred to the agent group 41.

Further, the user agent 43 returns a value of user's attributes requested by referring to the user definition storing section 42 when user characteristics are requested by the agent group 41 side.

As mentioned above, the user agent 43, in reply to the request from the user, or the request from the agents forming the agent group 41, the multi-agent cooperating system side need not take the form and contents of the user information into consideration which contributes to the simplification of the structure. Further, it is easily possible to cope with a plurality of users just by coupling a user agent 43 being a exclusive module for each user to the system.

Fourth Embodiment

Figure 12:
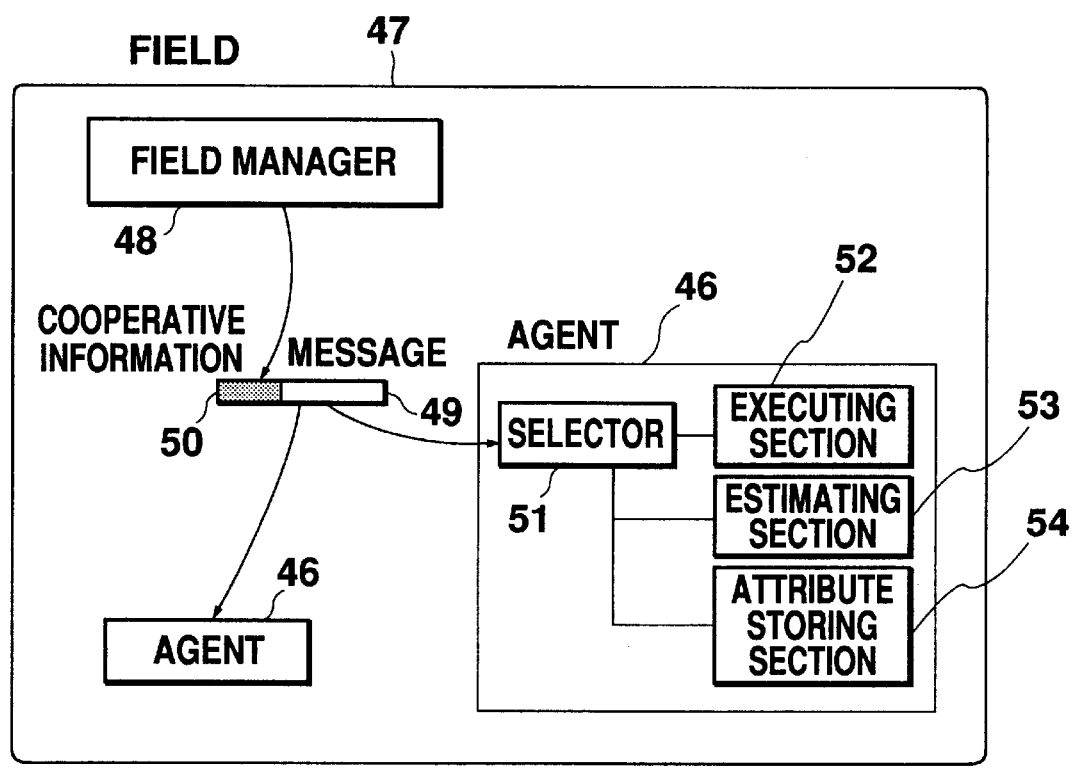
FIG. 12 is a block diagram showing a multi-agent cooperating system according to a fourth embodiment of this invention.

FIG. 12 shows a fourth embodiment of this invention. The multi-agent cooperating system according to this embodiment comprises a plurality of agents 46 for providing services to the user and has a field 47 for prescribing method of cooperation. The field manager 48 instructs and manages the cooperative operation between the agents 46 in the field 47. A variety of information is communicated between the field manager 48 and the agents 46 via the message 49. The field manager 48 adds cooperative information 50 to the message 49 for giving instructions relating to the cooperative operation. Each agent 46 includes a selector 51 for interpreting the cooperative information 50 contained in the message 49 and determining the cooperative operation, an executing section 52 for executing the service of the agent 46, an estimating section 53 for estimating the message having input, and an attributes storing section 54 for storing attributes of the agent 46.

Figure 13:
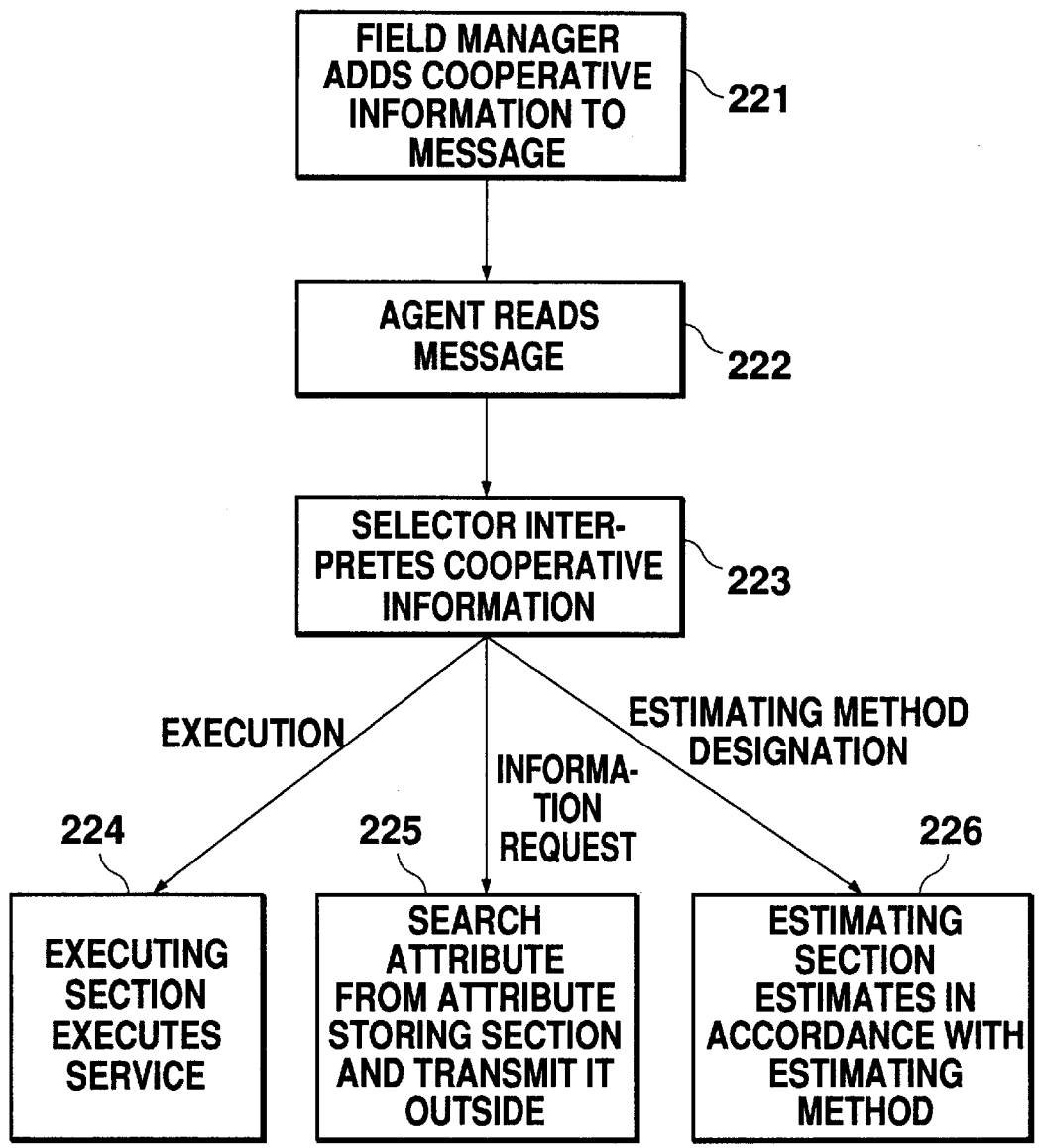
FIG. 13 is a flow diagram showing the function of the multi-agent cooperating system according to the fourth embodiment of this invention.

FIG. 13 is a flow diagram showing process according to this embodiment. The process will now be described with reference to this FIG. 13.

In the multi-agent cooperating system composed as mentioned above, the field manager 48 adds the cooperative information 50 to the message representing the request from the user (step 221). The cooperative information 50 in this embodiment is any one of the instructive information for entrusting the execution of the service, information for requesting the present of information contained in the agent 46, and information for designating an estimating method such as the preferential degree for the estimation. The agent 46 reads the message 49 to which the cooperative information is added (step 222), and the selector 51 determines the process in accordance with the contents of the cooperative information 50 (step 223). If the contents of the cooperative information 50 is such information as to entrust the execution of the services, the selector 51 transfers the message 49 to the executing section 52, which then execute the services indicated in the message 49 (step 224). If the contents of the cooperative information 50 is such information as to request the presentation of information, the selector 51 receives the attributes of the agent 46 indicated in the cooperative information from the attributes storing section 54 and transfers them outside (step 225). If the contents of the cooperative information 50 is to designate the estimating method, the selector 51 transfers the message 49 containing the cooperative information 50 to the estimating section 53, which then makes an estimation in accordance with the cooperative information (step 226).

As mentioned above, in this embodiment, the field manager 48 converts the contents of the cooperative information 50 and transfers them to the agent 46. As a result, it is possible to readily perform complicated cooperative operations simply by previously providing the means for executing the cooperative operation in accordance with the contents of the instructive information contained in the cooperative information 50, namely the executing section 52, the estimating section 53, and the attributes storing section 54 in each agent 46.

Fifth Embodiment

Figure 14:
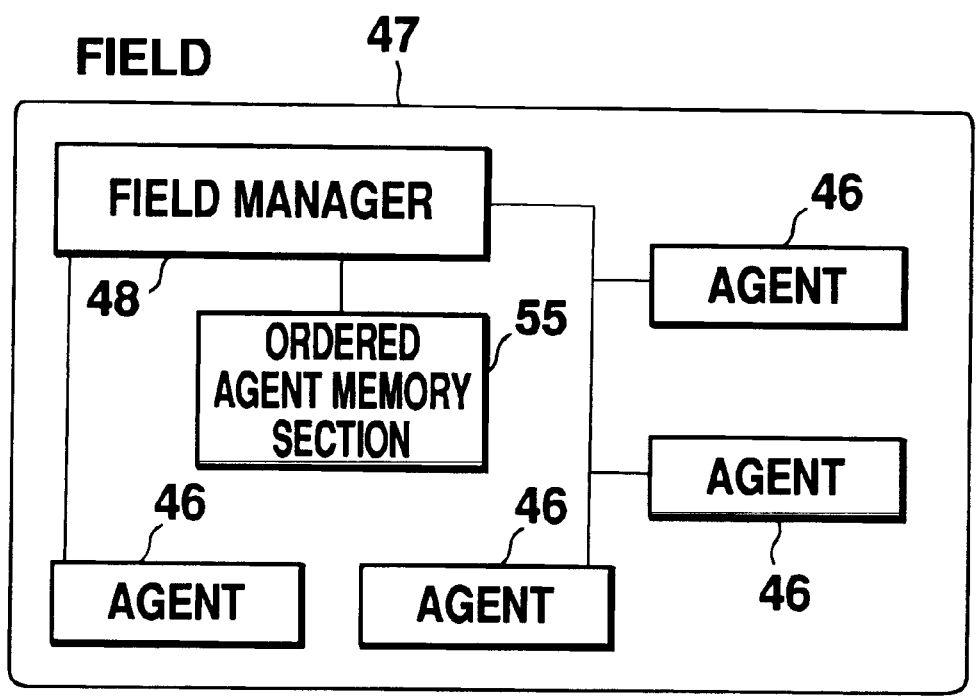
FIG. 14 is a block diagram showing a multi-agent cooperating system according to a fifth embodiment of this invention.

FIG. 14 shows a fifth embodiment of this invention. In FIG. 14, components equivalent to those in the previous embodiment are designated by the same numerals. As a significant feature of this invention, there is provided an entrusted target memory section 55 as a means for storing a combination of request patterns from a user and the agent that actually accepted the request as a set.

Figure 15:
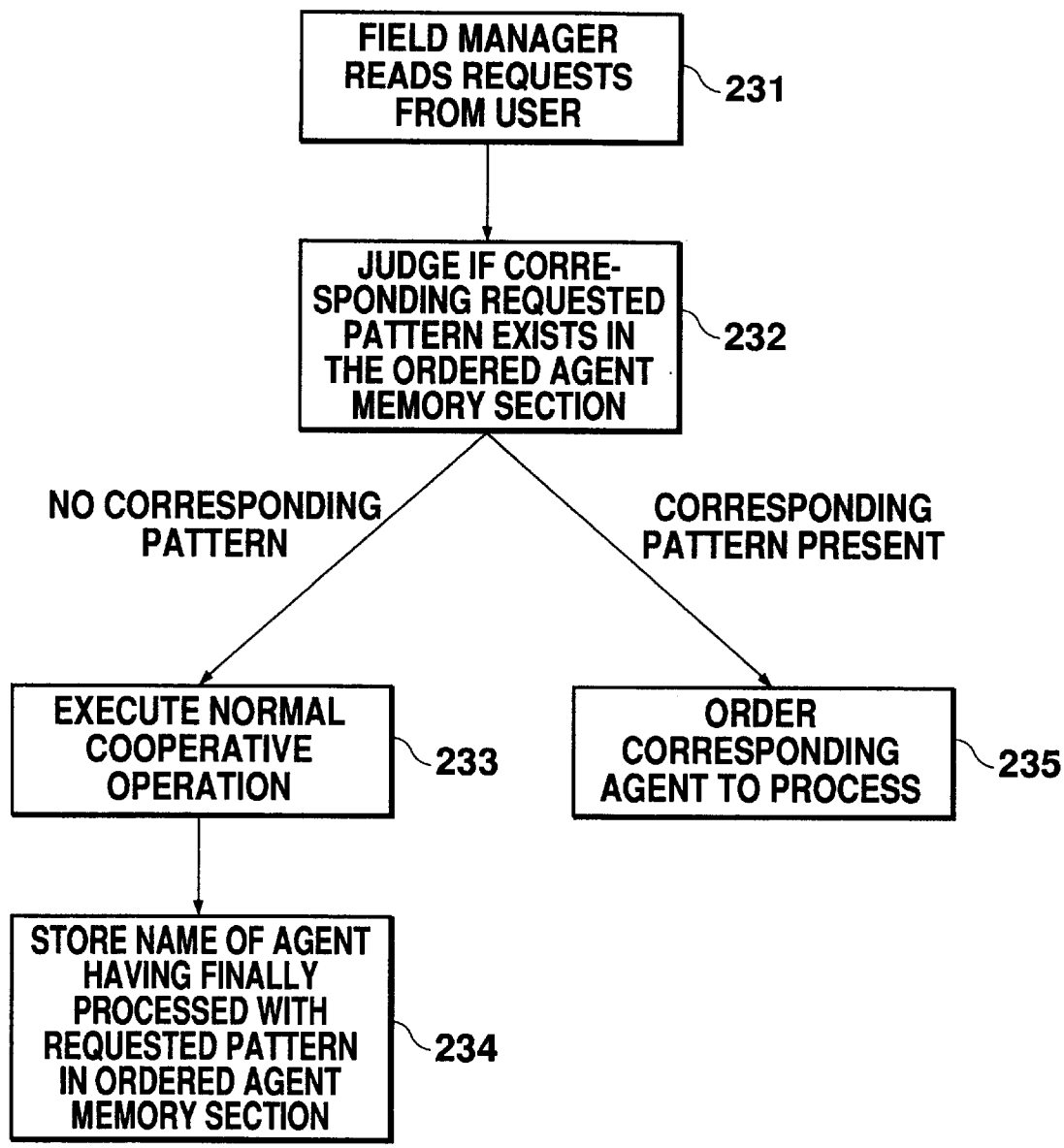
FIG. 15 is a flow diagram showing the operation of a multi-agent cooperating system according to the fifth embodiment of this invention.

FIG. 15 is a flow diagram showing a process of this embodiment.

In a multi-agent cooperating system composed as mentioned above, the field manager 48 reads the request from the user (step 231), and judges if the request pattern corresponding to the request exists in the entrusted target memory section 55 (step 232). If no corresponding pattern exists, normal processing is executed in accordance with cooperating rule previously prescribed (step 233). Namely, the contents of the request from the user are notified to the agent 46 in the field 47, and this agent 46 estimates the request, and if it judges to be able to process the request by itself, it inform the field manager 48 of that. The field manager 48 selects one agent 46 to process the request from the user in accordance with predetermined estimating criterion as shown in the first embodiment, for example. Thus, the agent 46 having finally processed the request and the request pattern are stored in the entrusted target memory section 55 as a set (step 234). If the request pattern corresponding to the entrusted target memory section 55 exists, the agent 46 having the entrusted target memory section 55 containing the request is preferentially and directly asked to execute the request (step 235).

As mentioned above, according to this embodiment, it is unnecessary to repeat the same cooperative operation each time so as to improve the processing efficiency since the same agent 46 stored in the entrusted target storing section 55 executes the process.

Sixth Embodiment

As a significant feature of the fifth embodiment, the set of the request pattern and the agent 46 having finally executed the request has been stored in the entrusted target storing section 55. In this embodiment, among the sets of the request and the agent having accepted the process of the request but not finally executing the process, those having an estimated value equal to or more than a threshold value after being referred to a predetermined estimating criterion that is a threshold contained in the field manager are stored in the entrusted target storing section 55.

Figure 16:
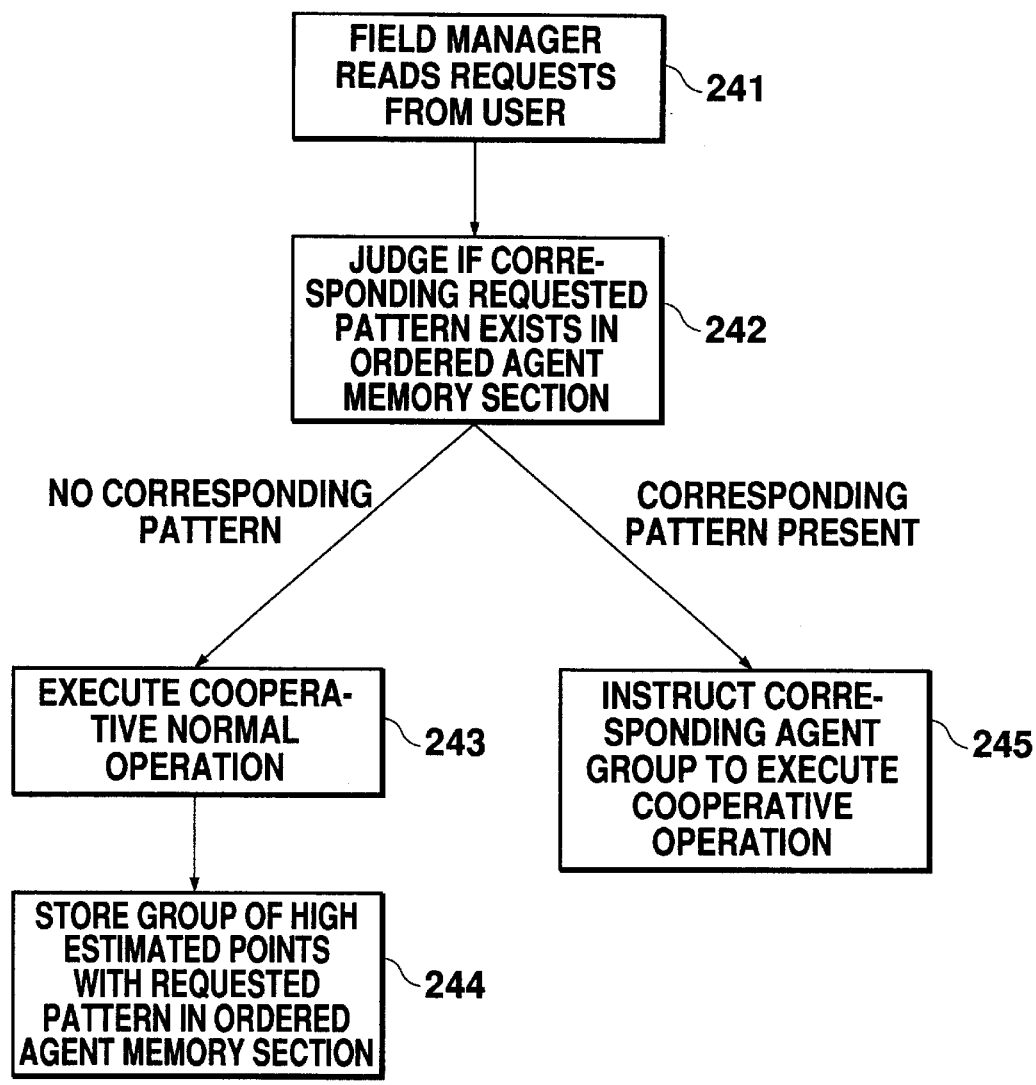
FIG. 16 is a flow diagram showing the operation of a multi-agent cooperating system according to a sixth embodiment of this invention.

FIG. 16 is a flow diagram showing the process according to this embodiment.

The field manager 48 reads the request from the user (step 241), and judges if the corresponding request pattern exists in the entrusted target memory section 55 (step 242). If no request pattern exists, normal processing is executed in accordance with a predetermined cooperating rule (step 243). At this time, among the agents 46 having an accepted to process the request, the group of the agent 46 having estimated value equal to or larger than a predetermined threshold of the field manager 48 together with the request pattern is stored in the entrusted target storing section 55 (step 244). When the request is input again, if the request pattern corresponding to the request exists in the entrusted target memory section 55, the request is presented only to the agent 46 stored in the entrusted target memory section 55, so that the cooperative operation is executed just between these agents 46 (step 245).

Incidentally, in the aforementioned embodiments 5 and 6, the entrusted target memory section 55 has been composed so as to be used by the field manager 48, but alternatively it is also possible to make the entrusted target memory section 55 be used by the user agent in the third embodiment, so that the user agent is ordered to limit the agents to be entrusted to process the request depending on the request pattern.

Seventh Embodiment

Figure 17:
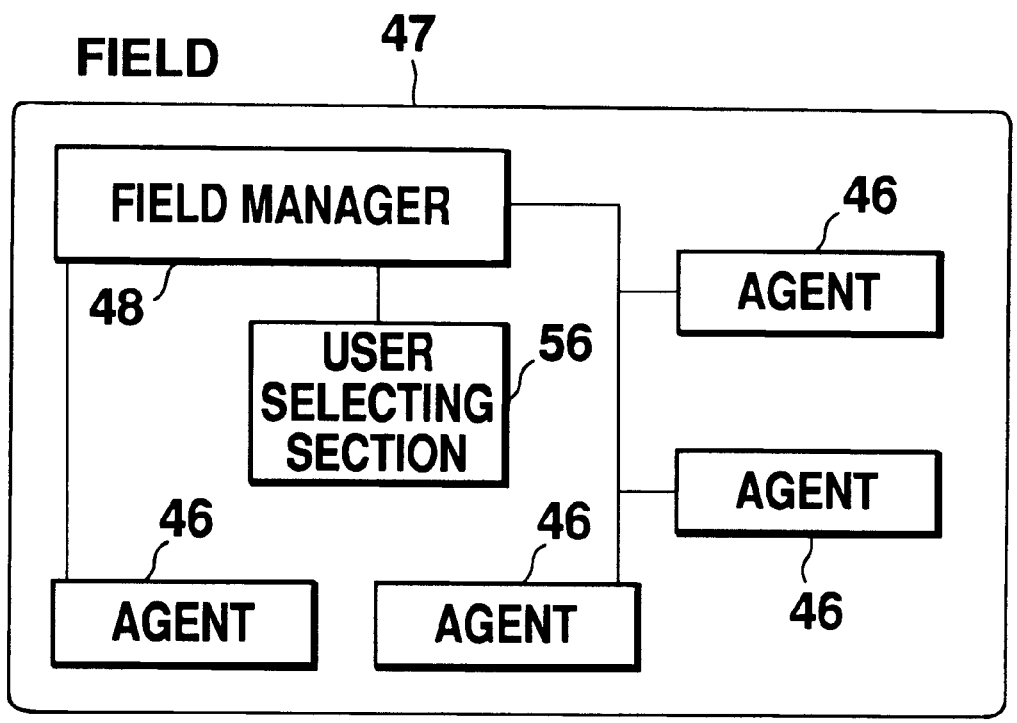
FIG. 17 is a block diagram showing a multi-agent cooperating system according to a seventh embodiment of this invention.

FIG. 17 shows a seventh embodiment of this invention. As a significant feature of this embodiment, there is provided a user selecting section 56 which presents the conditions for accepting the process sent from the agent 46 collectively to the user so that the user selects an appropriate agent 46 and to entrust the agent 46 to actually process the request based on the result of the selection. The other components are the same as those in fifth and sixth embodiments so as to be omitted from explanation.

Figure 18:
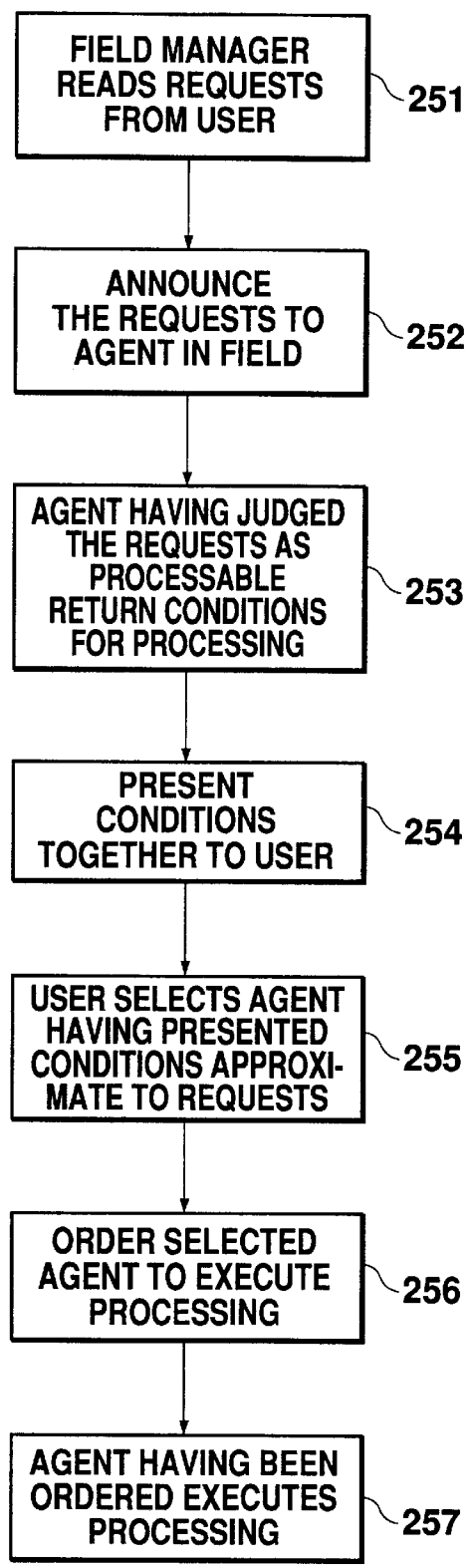
FIG. 18 is a flow diagram showing the operation of a multi-agent cooperating system according to a seventh embodiment of this invention.
Figure 19:
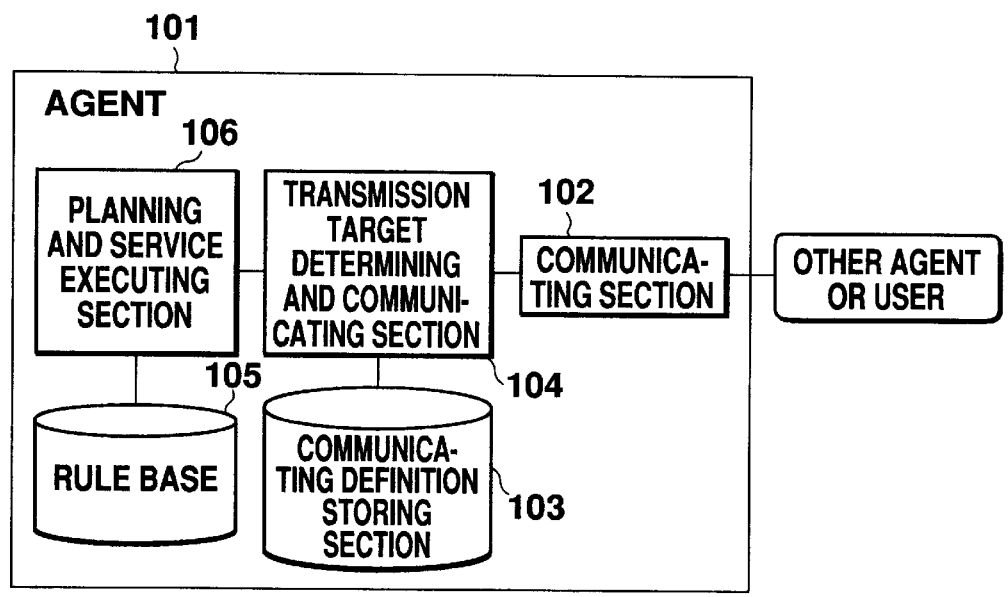
FIG. 19 is a block diagram of a conventional multi-agent cooperating system.
Figure 20:
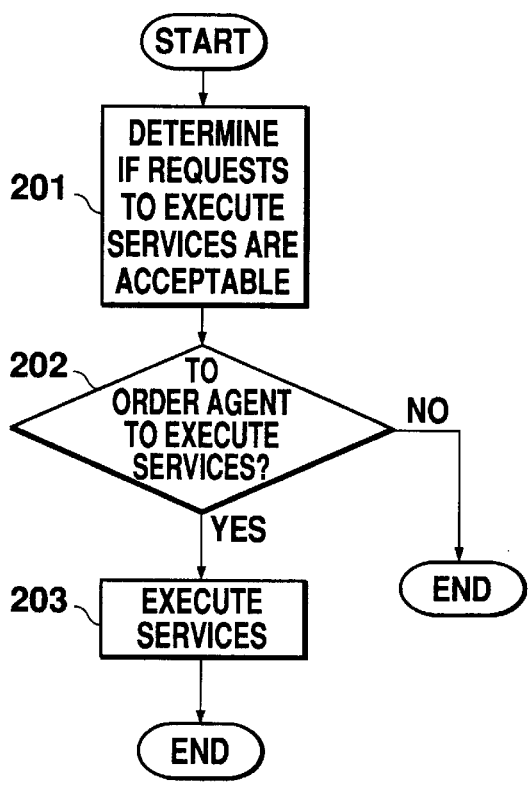
FIG. 20 is a flow diagram showing the general operation of the conventional system.
Figure 21:
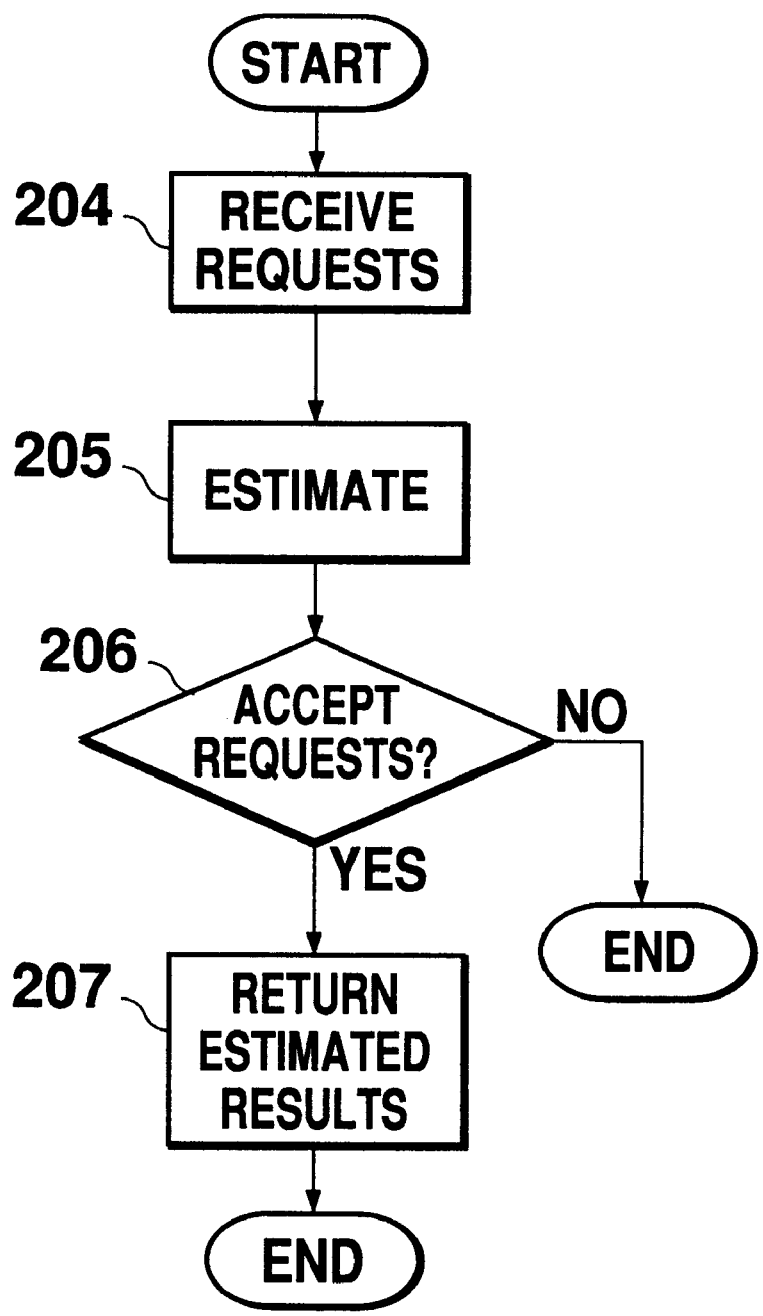
FIG. 21 is a detailed flow diagram of conventional steps to determine whether the service request can be accepted.
Figure 22:
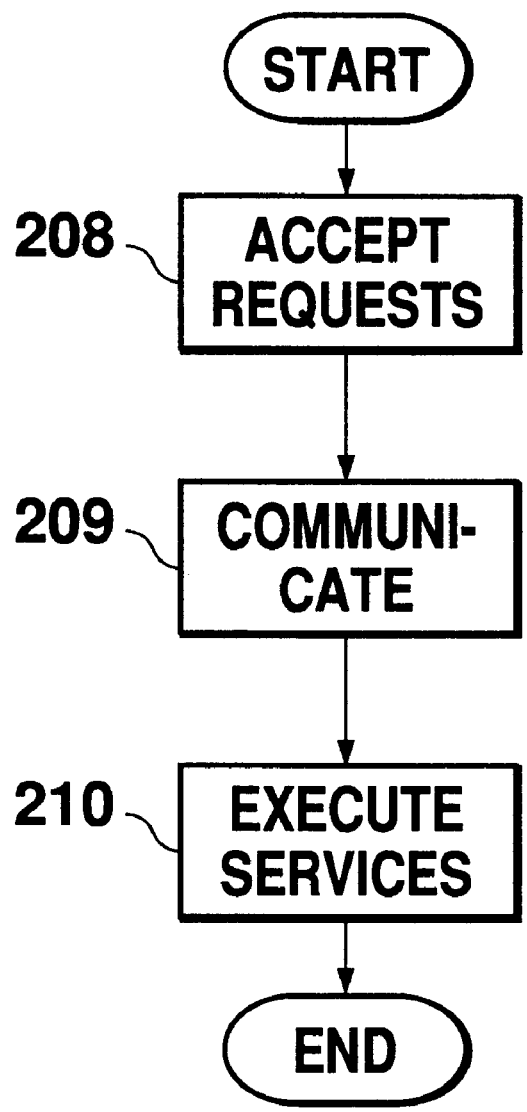
FIG. 22 is a detailed flow diagram showing steps to carry out entrusted services in a conventional multi-agent cooperating system.
Figure 23:
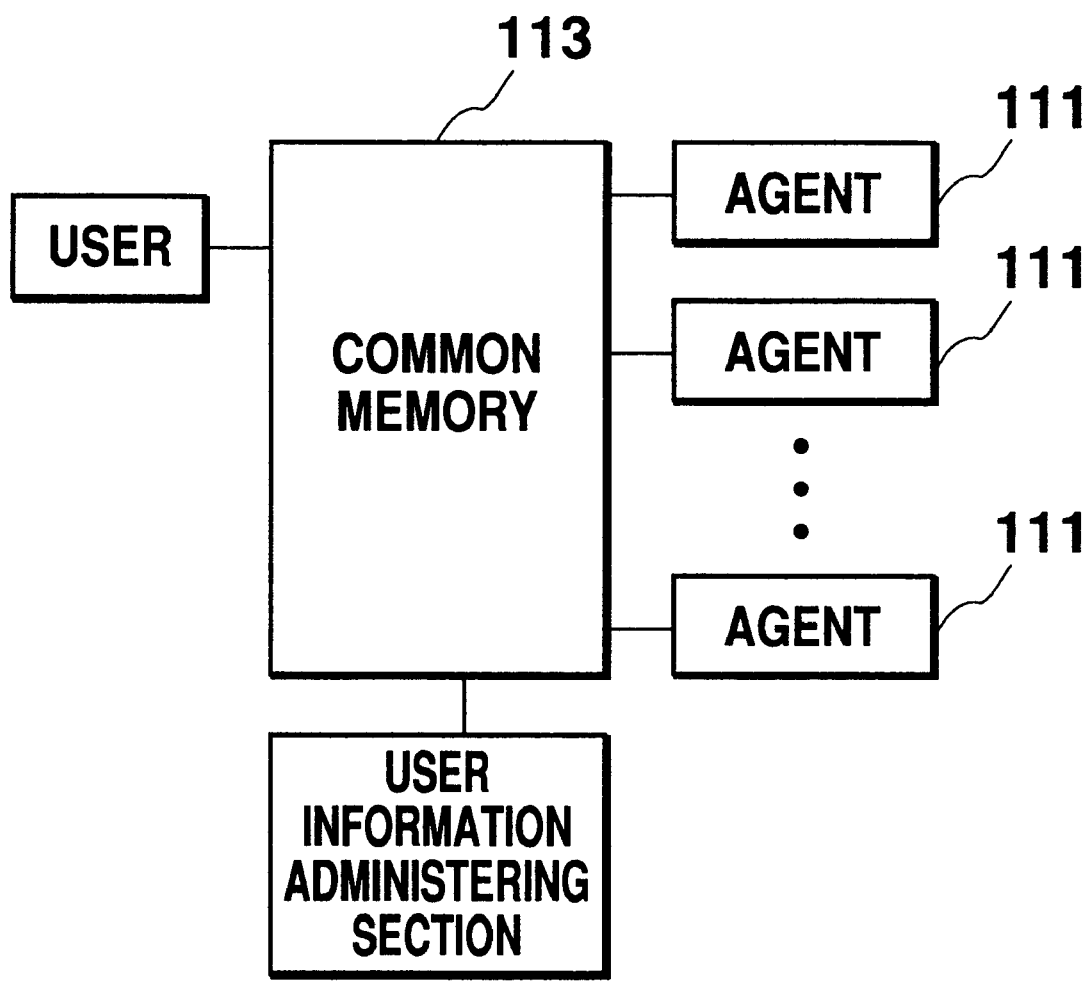
FIG. 23 is a block diagram showing a conventional multi-agent cooperating system.

FIG. 18 is a flow diagram showing the process according to this embodiment.

This embodiment is composed of the steps of: reading the request from the user by the field manager 48 (step 251); announcing the request to the agent 46 in the field 47 (step 252); sending conditions for executing the process to the agent 46 having judged to be able to process the request (step 253); presenting the conditions to the user using the user selecting section 56 by the field manager (step 254); selecting by the user an agent 46 having presented conditions that are the closest to the request of its own from the presented condition; actually entrusting the selected agent 46 by the field manager 48 to execute the process for the request (step 256); and processing the request by the entrusted agent 46 (step 257).

The operation of this embodiment will now be described with reference to FIG. 18.

In FIG. 18 step 251, the field manager 48 reads the request presented to the field 47 from the user. In step 252, the contents of the read request are sent to each agent in the field 47. In step 253, if the noticed agent 46 estimates the request as being processable by itself, it returns conditions for accepting the request. In step 254, the field manager 48 presents the conditions returned from the agent 46 to the user in a form selectable by the user through the user selecting section 56. In step 255, the agent 46 having presented the conditions closest to the request of its own among the presented conditions is selected. In step 256, the field manager 48 entrusts the agent 46 which corresponds to the conditions selected by the user to execute the process of the request. In step 257, the entrusted agent 46 executes the request.

As mentioned above, according to this embodiment, since detailed contents which are capable of being actually processed by the agents 46 even when the user inputs a request without designating the target agent so that the user actually selects the process and makes the agent execute the process, the utility of the user can be significantly increased.

Thus, by virtue of the aforementioned composition of this invention, the following advantages are obtained:

The planning, the resource distribution and the elemental function can be separately defined. As a result, the description of the application is simplified and eased, and also the definitions can be readily changed. Further, the total system mounting process can be made easily.

The cooperative definition can be made separately from those of the planning, resource distribution, and elemental function. Therefore, the description of the application is simplified and eased. The cooperative definition can also be easily changed.

Since the definition of the cooperation is described by the field manager, that of the plan by the planning agent, that of the elemental function by the elemental function agent, respectively, and a frame work to make them cooperatively function is provided, applications and total system can be readily obtained.

When an elemental function agent is introduced, the profile describing the contents relating only to the agent is automatically broadcasted and the necessary portions are automatically renewed. In consequence, it is unnecessary to make any renewal or rearrangement of the other portions of the system, which would improve the modularity between the elements.

Since three classes of estimating criterion are provided, and the estimation is made in the order from the hardest restriction, the estimating efficiency is improved. Also, the criterion is defined independently by each class for estimation, it is possible to provide the estimating data definition and the estimating process.

The definition of plan is opened to the user so as to be instantly suited to the needs of the user, and the planning process which is normally complicated and requires significant time to execute may be omitted. Consequently, the total process efficiency can be enhanced.

Since the user input is converted into an appropriate form reflecting the characteristics of the user within a scope that is acceptable by the system so as to be then transferred to the multi-agent cooperating system of this invention, the form or contents of the user information need not be recognized by the system side, which contributes to simplify the composition. Further, it is possible to easily cope with a plurality of users by simply coupling a module exclusive for each user to the system.

In addition, the cooperative operation of the agent can be changed by changing the contents of the cooperative information by the field manager, it is possible to realize a complicated function merely by mounting simple agents, and further it is possible to perform different cooperative operations when the field is changed within the same agent.

In addition, when the same request is repeatedly input, the process of the request is directly entrusted to the same agent as previously functioned, so it is unnecessary to repeat the same cooperative operation, which contributes to improved processing efficiency.

Moreover, by storing the agents which are capable of processing the request from the user and have an estimated value equal to or larger than the estimating criterion, it is possible to perform the cooperative operation just between these agents. Accordingly, the time required to execute the cooperative operation can be shortened since the range of the cooperation is shortened, and the request from the user can be replied to with high accuracy, so as to improve the processing efficiency.

Moreover, since the system operates at the time that the user inputs the request in a diffusion environment, even if the user does not recognize where the services are and which resources are capable of meeting its request, the agent which has the service and the resource for meeting the request can reply by itself. As a result, the utility of the services and the resources in the diffusion environment can be easily enhanced.

What is claimed is:

1. A multi-agent cooperating method for providing services requested from a user, by cooperative operation of a plurality of agents, comprising the steps of:

executing a planning process separate and distinct from the plurality of agents upon receipt of a request for services from a user, said separate and distinct planning process performed by a first set of said plurality of agents that are mutually exclusive from a second set of said plurality of agents that are to execute elemental functions for providing the requested services, the method including the steps of;

first, determining a combination of elemental functions for providing the requested services;

next, determining data to be transmitted and received between the functions;

next, determining a plan for executing the functions;

next, determining load states for the agents;

next, distributing the elemental functions to the plurality of agents in such a manner that the load state of the agents is maintained at or near said determined load state; and next, executing the elemental functions by the agents.

2. A multi-agent cooperating method according to claim 1, wherein said plan determining step includes the steps of:

determining a procedure of cooperation between the agents, determining the collection of members of the agents to cooperate, and determining the elemental functions to be performed.

3. A multi-agent cooperating system for providing services in reply to a request from user by cooperative operation of a plurality of agents, said multi-agent cooperating system comprising:

one or more elemental function agents for providing an elemental function in a sequenced order;

one or more planning agents, each planning agent receiving a request from the user, defining a plan that is separate and distinct from the plurality of agents for execution of elemental functions to complete the request, and distributing tasks to said elemental function agents in an efficient sequence; and at least one field manager, connected to said elemental function agents and said planning agents, and storing definitions as to members of the planning agents and the elemental function agents and a procedure of the cooperation describing the sequence of execution and organization between the elemental function agents and the planning agents, for managing and sequencing the cooperative operation between the elemental function agents and the planning agents, each field manager communicating said user requests as well as instructions to said planning agents for sequenced planning and execution.

4. A multi-agent cooperating system according to claim 3, wherein said at least one field manager includes:

a communicating means for transmitting and receiving information to and from the planning agents and user;

a cooperative definition data base for storing definitions of the planning agents and elemental function agents to cooperate and of the procedure of the cooperative operation; and a cooperative operation executing means connected to said communicating means for communicating said procedure for cooperative operation to the other agents to execute said procedure.

5. A multi-agent cooperating system according to claim 3, wherein each planning agent includes:

a rule base for storing rules to produce plans;

a planning means for producing plans referring to the rule base;

an estimating data storing means for storing basics for estimating performance characteristics for a request; and an estimating means for making estimation of performance characteristics in accordance with the contents in said estimating data storing means in response to a request message from the at least one field manager.

6. A multi-agent cooperating system according to claim 3, wherein each elemental function agent includes:

a communication means for transmitting and receiving information to and from agents;

a function definition storing means for storing definition of the elemental functions which can be executed by the elemental function agent;

an elemental function executing means for executing an elemental function in accordance with the contents of said function definition storing means in response to an instruction from the planning agent;

an estimating data/profile storing means for storing estimating data and profile; and an estimating means for making estimation in accordance with the data and profile stored in the estimating data/profile storing means in response to an estimation request for specified functions from the planning agent.

7. A multi-agent cooperating system according to claim 3, wherein classes of criterion for distributing tasks include:

restrictions that should be necessarily met in view of the specification;

wide range of allowance provided with preferential index by the user in accordance with user preference; and cost of resource calculated from load state of a CPU and its associated equipments.

8. A multi-agent cooperating method for executing cooperative operation using a multi-agent cooperating system having field managers, a plurality of planning agents and a plurality of elemental function agents, comprising the steps of:

receiving a service request from the user to said field managers;

said field managers adding instructions to said service request related to cooperation between planning agents and elemental function agents;

said field managers transmitting said service request and instructions to the planning agents;

said field managers planning the functions to be executed by the elemental function agents separate from the plurality of elemental function agents and the planning agents and in accordance with the service request and the instructions received by each of said planning agents;

said field managers communicating a request to the plurality of elemental function agents to make an estimation as to load;

estimating the load upon receipt of a request by the plurality of planning agents and communicating the estimate of the load to the plurality of planning agents;

estimating request performance by the plurality of planning agents based upon estimates from the plurality of elemental function agents;

determining if the result of the estimation is in accordance with the service request and if the instructions meet a prescribed criterion and communicating the estimation to the field manager;

combining estimations from the plurality of planning agents and the elemental function agents in said field manager;

selecting a planning agent to execute the service based on the combined estimations and informing this planning agent of that fact; and executing the service in accordance with the plan by the elemental function agents.

9. A method for adding an elemental function agent to a multi-agent cooperative system having a field manager, a plurality of planning agents, and a plurality of elemental function agents, said method comprising the steps of:

transmitting a profile stored in an estimating data/profile storing means of new elemental function agent to the field manager and to one of the planning agents;

estimating contents of the profile received from the new elemental function agent;

selectively registering the profile;

registering the new elemental function agent as a member in a cooperative definition data base of the field manager such that the field manager discretely manages the registrations of the elemental function agents.

10. A multi-agent cooperating system for providing services in reply to a request from user by cooperative operation of a plurality of agents, said multi-agent cooperative system comprising:

a user interface agent for providing services requested by the user;

a field manager receiving the request and managing cooperative operation between the plurality of agents, said field manager adding instructions related to the cooperative operation to the user's request which is separate and apart from all other planning information generated by said plurality of agents;

means for causing execution of the requested services by an agent;

means for estimating an input message; and attribute storing means for storing attributes of said agents, wherein the plurality of agents use the instructions in both planning and executing the request.

11. A multi-agent cooperating method for providing services requested from a user, by cooperative operation within a multi-agent cooperating system having at least one field manager, a plurality of planning agents and a plurality of elemental function agents, comprising the steps of:

first, said field manager determining a combination of elemental functions for providing requested services in response to a request for services from a user;

next, said field manager generating instructions related to planning and execution to be transmitted to said planning agents;

next, said planning agents determining an estimated plan for executing elemental functions responsive to said user request for services;

next, said elemental function agents determining load states for the planning agents upon direction from said planning agents;

next, said field manager selecting a planning agent to carry out its corresponding plan to attain services for the user, and distributing the elemental functions to the plurality of elemental function agents in such a manner that the load states of the planning agents are maintained at or near said determined load state, wherein said selection of planning agent and distribution of functions are determined based on at least one of the load determination by the elemental function agents and the estimated plan of the planning agents; and lastly, said elemental function agents executing the elemental functions in accordance with the plan of the selected planning agent.

12. A multi-agent cooperating method according to claim 11, wherein said estimated plan determining step includes the steps of:

determining a procedure of cooperation between the elemental function agents, determining the collection of members of planning and elemental function agents to cooperate, and determining the elemental functions to be performed by the elemental function agents.

* * * * *